United States Patent Office 3,118,779
Patented Jan. 21, 1964

3,118,779
CEMENT COMPOSITION
Bernard S. Leonard, Arlington, Va., assignor to Solidite Corporation, a corporation of the District of Columbia
No Drawing. Filed June 9, 1961, Ser. No. 115,942
1 Claim. (Cl. 106—98)

This invention relates to dry mixtures possessing an ability to set to a hard, strong product either underwater or in the atmosphere. More particularly, it relates to compositions comprising high early strength Portland cement and a particular grade of silica sand proportioned so as to set into a product which is not penetrated by water and does not absorb water approximately four minutes after it has been mixed with a suitable amount of water and to the further improvement in such compositions, conferred by the addition of suitable proportions of sodium bicarbonate thereto.

Briefly, the compositions constituting this invention comprise dry mixtures consisting of Type III Portland cement, a high early strength grade defined in the A.S.T.M. Standards under A.S.T.M. designation No. C-150–56, plus No. 1 silica sand, a white sand of substantially uniform texture and grain size, 98.4% of which is retained on a No. 100 mesh screen and 1.7 of which is retained on a No. 30 mesh screen, and containing, as an optional constituent, a relatively small but nevertheless important amount of sodium bicarbonate.

Said mixture is conveniently formed by merely blending the dry ingredients in a batch mixer of adequate size, in the following relative proportions:

| | Parts by weight |
|---|---|
| Type III Portland cement | 4–5 |
| No. 1 silica sand | 2 |
| NaHCO$_3$ | [1] 2.5 –6% |

[1] Based on the total of cement plus sand.

While the proportions do not appear to be critical, it has been found that enriching the mixture beyond 2.5 parts of cement per 1 part of sand by weight results in a product which crumbles, and that increasing the relative proportion of sand in the mixture very much above one part of sand for each two parts of cement yields products which do not possess the property of being able to dry quickly under water.

The relative proportions of bicarbonate may not be varied appreciably from the range specified. When present in amounts below 2.5%, the bicarbonate produces no noticeable acceleration of the time required for the cement-sand mixture to set, especially under water. At the other end of the range, it has been found that amounts of bicarbonate above 6% are detrimental, particularly where the mixture is used in locations not immersed in water. In these instances the excess of bicarbonate soon comes to the surface as a noticeable powdery white deposit which may mar the appearance of the patched area.

Once a suitably proportioned dry mixture has been prepared, it may be stored in jars, cans, or other sealed containers for extended intervals of time, until it is desired to use the mixture.

When it is desired to use the composition for patching cracks, sealing leaks or repairing breaks in walls, steps, sidewalks, or even boat hulls while they are in water, the surface is first prepared in the usual manner, i.e., it is scraped or brushed clean, cracks or holes are widened by grouting tools or otherwise, to facilitate application of the mixture and then the mixture of the dry solids is blended with as little water as is necessary, about one part of water to three parts of dry solids usually being required to produce a stiff mix suitable for application.

The preferred mode of application is to dampen the clean areas with a sponge or brush and to apply the stiff mixture immediately thereafter to the dampened area with a trowel or other tool, and to then permit the mixture to set or harden.

The mixture will set to a hard strong product even under water. One possible reason for this is that once it is formed, the mixture does not appear to absorb any water shortly after the original addition of water to form the original stiff mixture. When running leaks are to be repaired or the mixture is to be applied under water, a delay of 2–3 minutes between completion of mixing with water and application of the wet mixture to the under water area is desirable so as to permit the mixture to acquire its imperviousness to penetration by water. Then the stiff mix is forced into place with the hand or by mechanical means and is held in place for another 2 to 3 minutes after which the hand or applicator is withdrawn, leaving the patch as a water resistant body.

Representative samples of a 2:1 (cement:sand) mixture containing 8 parts of sodium bicarbonate for each 150 parts of cement plus sand by weight, set to a compressive strength of 2250 pounds per square inch when permitted to dry in air for 48 hours.

In addition to the foregoing uses, it has been found that the compositions formed by the addition of water to the mixtures described will adhere to hard solids, such as rock, stone, cement, marble and the like, to metals such as iron and steel, and to wood and other "porous" materials.

The foregoing description is illustrative of a preferred mode of practicing the invention which is not intended to be limited except as required by the appended claim.

I claim:

A dry mixture consisting of between 4 and 5 parts by weight of Type III Portland cement, 2 parts by weight of No. 1 silica sand and between 2.5% and 6% by weight of sodium bicarbonate, based on the total of cement plus sand.

References Cited in the file of this patent
UNITED STATES PATENTS

| Re. 3,675 | Westermayr | Oct. 12, 1869 |
| 2,240,744 | Arpin | May 6, 1941 |
| 2,597,370 | Peckman | May 20, 1952 |
| 2,836,502 | Bartoli et al. | May 27, 1958 |

OTHER REFERENCES

Lea and Desch: The Chemistry of Cement and Concrete, Edward Arnold Publishers, 1956, pp. 468–469.